UNITED STATES PATENT OFFICE.

FRITZ HOFMANN, OF ELBERFELD, GERMANY, ASSIGNOR TO FARBENFABRIKEN OF ELBERFELD CO., OF NEW YORK, N. Y., A CORPORATION OF NEW YORK.

BENZOYL CHLORID DERIVATIVE OF BETA-ETHYLTETRAMETHYLDIAMINOGLYCERIN.

No. 808,748.   Specification of Letters Patent.   Patented Jan. 2, 1906.

Application filed June 24, 1905. Serial No. 266,846.

*To all whom it may concern:*

Be it known that I, FRITZ HOFMANN, doctor of philosophy, chemist, residing at Elberfeld, Germany, (assignor to the FARBENFABRIKEN OF ELBERFELD Co., of New York,) have invented a new and useful Improvement in a New Pharmaceutical Compound; and I hereby declare the following to be a clear and exact description of my invention.

I have found that the hitherto unknown hydrochlorid of the benzoyl derivative of beta-ethyltetramethyldiaminoglycerin of the formula

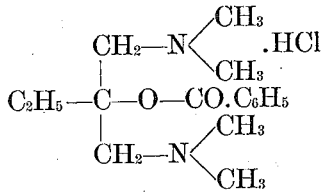

is a valuable local anesthetic.

The new compound can be obtained by treating beta-ethyltetramethyldiaminoglycerin with benzoyl chlorid and caustic-soda lye and then converting the resulting compound into its hydrochlorid.

It may be remarked that the above-mentioned beta-ethyltetramethyldiaminoglycerin can be obtained by the action of dimethylamin on beta-ethyldichlorhydrin of the formula

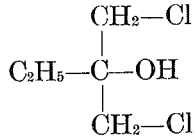

which compound can be produced by the action of dichloracetone ($CH_2$—Cl—CO—$CH_2$—Cl) on ethyl magnesium bromid dissolved in ether and decomposition of the thus-obtained magnesium compound with water or acids.

In carrying out my process practically I can proceed as follows, the parts being by weight: Into a vessel provided with a reflux condenser, a stirrer, and a dropping-funnel and containing forty-eight parts of magnesium filings covered with ether (free from water and alcohol) a mixture of two hundred and eighteen parts of ethyl bromid and three hundred parts of ether is dropped while cooling. A reaction sets in, and the metal dissolves with the production of an additional compound of the formula

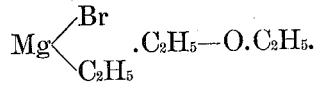

To the solution thus obtained two hundred and fifty-four parts of dichloracetone ($CH_2$—Cl—CO—$CH_2$—Cl) dissolved in ether are added while cooling and stirring. After about twelve hours ice-water and then such a quantity of dilute sulfuric acid is added as will be necessary to dissolve the precipitated magnesium compound. The ethereal solution is separated from the water, dried, and concentrated on the water-bath. By distillation of the residue *in vacuo* the beta-ethyldichlorhydrin having the above-given formula is obtained. It is a colorless oil boiling at 77° centigrade under a pressure of fifteen millimeters. In an autoclave a mixture of one hundred and fifty-seven parts of beta-ethyldichlorhydrin thus obtained, one hundred and eighty parts of dimethylamin, and six hundred parts of water is heated to 180° centigrade for about three hours. The resulting liquid is then acidulated with hydrochloric acid and extracted with ether for several times. The acid solution is then evaporated to dryness on the water-bath and the residue is mixed with ether and decomposed by the addition of concentrated caustic-soda lye. The ethereal solution of the beta-ethyltetramethyldiaminoglycerin and the dimethylamin thus obtained is dried over caustic potash, the ether and the dimethylamin are driven off, and the residue is distilled *in vacuo*. The new compound is a colorless oil boiling at 87° centigrade under a pressure of seventeen millimeters. In order to prepare its benzoyl derivative, one hundred and seventy-four parts of this compound are slowly mixed with two hundred parts of a twenty-per-cent. caustic-soda lye and one hundred and forty and one-half parts of benzoyl chlorid on cooling by the addition of ice to the reaction mass, which is then extracted with ether. The ethereal solution is dried, the ether is distilled off, and the residue thus obtained is mixed with such a quantity of hydrochloric acid as corresponds with one molecule of HCl. After evaporation to dryness the resulting salt is crystallized from acetone. The hydrochlorid of benzoyl-beta-ethyltetramethyldiaminoglycerin thus obtained having the above-given formula represents, after being dried at 100° centigrade, white crystals melting at 169° centigrade. It is soluble in water and acetone.

Solutions of the new compound are employed in medicine in the manner known and in use for local anesthesia.

Having now described my invention and in what manner the same is to be performed, what I claim as new, and desire to secure by Letters Patent, is—

The herein-described new hydrochlorid of the benzoyl derivative of beta-ethyltetramethyldiaminoglycerin having the formula:

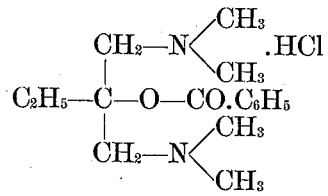

forming white crystals melting at 169° centigrade which are soluble in water and in acetone, and being a valuable local anesthetic, substantially as described.

In testimony whereof I have signed my name in the presence of two subscribing witnesses.

FRITZ HOFMANN.

Witnesses:
OTTO KÖNIG,
HERMANN SCHRÖDER.